May 14, 1963     R. I. R. DEAN     3,089,334
TORQUE PINS
Filed March 7, 1960
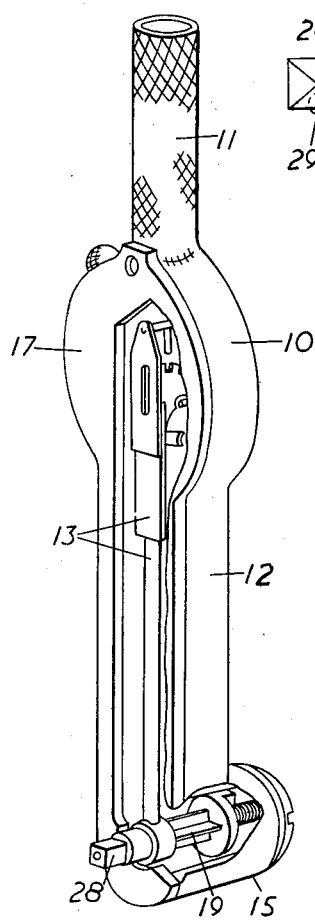
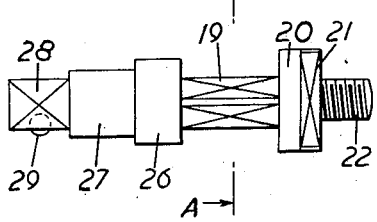
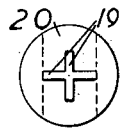
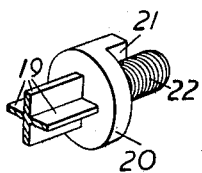
Inventor
REGINALD I. R. DEAN
By *Imirie & Smiley*
Attorneys United States Patent Office 3,089,334
Patented May 14, 1963

3,089,334
TORQUE PINS
Reginald I. R. Dean, 14–16 Curzon St., Derby, England
Filed Mar. 7, 1960, Ser. No. 12,978
1 Claim. (Cl. 73—139)

This invention relates to torque pin and torque spanners.

The invention is designed particularly to provide a torque spanner which can be used for very light loadings. The normal requirement in these instruments is for indicating fairly high torques.

Circumstances have arisen, however, in which a torque spanner is required to give an accurate indication of lighter loadings, possibly up to about 5 inch/pounds, and consequently a torque pin is required which is capable of great flexibility at light torques. At the same time it is essential that the torque pin shall be rigid on its axis so that it cannot easily be bent or deflected other than rotationally, as otherwise the accuracy of the instrument would be lost.

The object of this invention is to provide an improved form of torque pin and torque spanner which will fulfil these requirements.

The invention consists in a torque pin which is of a cross-sectional form comprising several radially extending members, vanes or splines.

The preferred form of torque pin is of a cruciform section, but it would be possible to use torque pins having fewer than four vanes, or more than four, if desired.

It is preferred to arrange these radial members at equal angles apart radially.

A constructional form of the invention will now be described with reference to the accompanying drawings in which:

FIGURE 1 is a general perspective view of the rear of a torque spanner with the housing partly broken away.

FIGURE 2 is an elevation of a torque pin.

FIGURE 3 is a section on line A—A of FIGURE 2.

FIGURE 4 is a part perspective view of the torque pin on the plane A—A of the section.

The instrument comprises a housing 10 of cylindrical shape which accommodates the gearing and is provided with the usual gauge dial and pointer on its front face. There is a handle 11 for grasping the instrument. The housing also has an extension 12 which encloses a torque pin and torque lever 13 by which the gearing is operated in accordance with twist imparted to the torque pin, which is firmly anchored in a boss 15 forming an integral part of the housing. A removable back plate 17 is provided to enclose the housing and its mechanism.

The torque pin, see particularly FIGURES 2, 3 and 4, comprises a main portion 19 which is of cruciform section, a flanged part 20 of larger diameter having flats or shoulders 21, an end portion 22 formed with screw-threads to receive an end cap or nut, another flanged portion 26 on which the torque lever 13 is secured, and another portion 27 which is of larger diameter than the main part of the pin but of smaller diameter than the flanged parts 20, 26 and which projects through a hole of the appropriate size in the back plate 17. Finally the extreme projecting end 28 of the torque pin is of square shape and constitutes the torque nut. This is fitted with a spring loaded ball 29 on one face.

In operation a torque applied to this nut 28 is communicated by the torque pin 19 to the torque lever 13, whose consequent deflection is imparted to the gearing which actuates the dial pointer.

The torque pin can be secured in the housing in any convenient manner but the preferred way of doing this is as described in the specification of my prior American patent application No. 684,999, now Patent 2,955,856.

The invention is not restricted to any particular arrangement of gearing for operating the dial pointer, but preferably mechanism as described in the specification of my prior American patent application No. 639,433 now Patent 2,977,801 is used.

The torque pin has a variety of other uses as well as in a torque spanner, or torque wrench as it is sometimes called, as it can be adopted wherever a rod, bar, or shaft is required to be able to respond to torques, twisting moments, or other rotational forces, and yet to be able to return to its normal position as soon as these forces are relieved. No separate spring is needed to return it, and its length can be much shorter than an ordinary rod or the like having the same flexibility.

I claim:

In a torque indicating instrument, a mechanism for transmitting motion engendered by a torque force to an indicator, comprising an elongated tubular housing laterally enlarged at one end to enclose an indicator, a handle extending longitudinally of the housing from said enlarged end, a relatively short torque pin within the other end of the housing and extending laterally of the housing, one end of said torque pin being anchored to the housing, said torque pin crossing said housing and having a free end protruding through an opening in the housing for a short distance, said protruding end of the torque pin being provided with planar faces to define a torque nut, and a torque lever extending longitudinally of the housing and connected at one end to the torque pin and its other end to the indicator and responsive to twisting of the torque pin to move the indicator, said torque pin being a solid member having means at its anchored end for securing the torque pin to the housing including a reduced neck portion extending axially of the member for securement within an opening in the housing and an enlarged portion adjacent said neck portion for bearing against the housing, said torque pin having an enlarged collar portion adjacent its free end to which said lever is secured, and an intermediate reduced portion within the housing between said collar and enlarged portions whose cross sectional form includes at least three spline-like elements extending radially from the axis of said member and arranged at substantially equal angles apart, whereby to provide great flexibility to the torque pin at light torques and enable greater movement of said lever.

References Cited in the file of this patent
UNITED STATES PATENTS

| | | |
|---|---|---|
| 2,219,632 | Naden | Oct. 29, 1940 |
| 2,394,022 | Storrie | Feb. 5, 1946 |
| 2,819,610 | White | Jan. 14, 1958 |
| 2,822,677 | Reynolds | Feb. 11, 1958 |

OTHER REFERENCES

Torque Manual, second edition, by P. A. Sturtevant Co., copyright 1957, page 5.